June 10, 1969   J. W. TUCKER ETAL   3,449,615
XENON FLASH LAMP FOR LASER PUMPING IN LIQUID NITROGEN
Filed March 25, 1965

INVENTORS
JAMES N. BRADFORD
JAMES W. TUCKER

BY *Melvin L. Crane, Agent*

*[signature]* ATTORNEY

United States Patent Office  3,449,615
Patented June 10, 1969

3,449,615
XENON FLASH LAMP FOR LASER PUMPING IN LIQUID NITROGEN
James W. Tucker, Alexandria, and James N. Bradford, Falls Church, Va., assignors to the United States of America as represented by the Secretary of the Navy
Filed Mar. 25, 1965, Ser. No. 442,838
Int. Cl. H01j 61/16, 61/12
U.S. Cl. 313—226   3 Claims

ABSTRACT OF THE DISCLOSURE

This disclosure is directed to a xenon flash lamp for laser pumping in liquid nitrogen. The lamp includes an operating gas of xenon and a starting gas selected from helium, neon, argon, krypton, hydrogen or nitrogen at a partial pressure of from 5 to 400 torr depending on the type of starting gas used. The starting gas is activated which in turn heats the xenon so that the tube will then operate with the xenon. The starting tube and laser are immersed in liquid nitrogen and the lamp may be operated even though it is immersed in the liquid nitrogen.

---

The invention described herein may be manufactured and used by or for the Government of the United States of America for governmental purposes without the payment of any royalties thereon or therefor.

The present invention is directed to a flash lamp such as used in laser systems and more particularly to a flash lamp useable in a laser system operable at a temperature which is lower than the temperature at which the gaseous filling within the lamp freezes or at which the partial pressure of the gaseous filling is too low to permit the establishment of an electrical discharge.

Heretofore suitable flash lamps have been provided for laser systems which are operable at room temperature. Many experiments in laser physics and laser system application require that the laser material be cooled to a temperature of negative 180° C. or lower. In a typical system the cooling is accomplished by immersing the laser rod in liquid nitrogen contained in a fused silica Dewar flask. The Dewar flask is placed within the coil of a helical flash lamp, or one or more linear flash lamps are placed alongside the Dewar flask outside the liquid nitrogen. Such laser systems are operable; however, there are several disadvantages in such a system. For example, the dimensional constraints of the Dewar limit the size of the laser elements that may be used, and maximum pump-laser coupling efficiency can not be obtained through the Dewar container. Pump-laser coupling efficiency can be improved by immersion of the flash tube in the liquid nitrogen. However, when prior-art flash lamps such as xenon are immersed in a coolant at a temperature below neg. 180° C. or in liquid nitrogen, the xenon gas they contain freezes or the partial pressure becomes so low that the flash lamps become inoperable. Thus, the flash lamps in prior-art systems must be placed outside the Dewar flask.

The disadvantages of the prior art flash lamp-laser systems are overcome by the present invention wherein a flash lamp is provided which can be immersed within the coolant and thereafter operated as desired in a laser system.

It is therefore an object of the present invention to provide a flash-lamp laser system in which the flash lamp is operable at temperatures of —180° C. and lower.

Another object is to provide an improved flash lamp which is operable at temperatures of —180° C. and lower for any desired purpose.

Still another object is to provide flash lamps, operable at temperatures of —180° C. and lower which use the designs, structures and components of prior-art flash lamps with only small additional cost.

Other objects, advantages and features of the present invention should become apparent from the following detailed description which is taken in conjunction with the accompanying drawing, in which.

The present invention is directed to a gas type flash lamp which may be operated while immersed in a coolant at a temperature of —180° C. or lower. The flash lamp contains a mixture of xenon, at a partial pressure of 5 to 1500 torr, and one of the following gases, namely helium neon, argon, krpton, hydrogen, or nitrogen, as a starting gas, at a partial pressure of 5 to 400 torr. The pressures of each gas are specified for a temperature of about 25° C. The starting gas will be characterized at any selected operating temperature by a vapor pressure high enough to allow an electrical arc discharge to be initiated. Since xenon is frozen and has a very low vapor pressure at a temperature of —180° C., flash lamps containing only xenon cannot be operated at that temperature. The addition of a starting gas allows one to start a discharge that will heat and vaporize the frozen xenon, which will then sustain an arc discharge.

Figure 1:
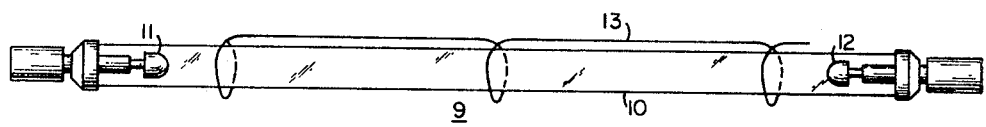
FIG. 1 represents a linear flash lamp made in accordance with the present invention.

Now, referring to the drawings, wherein like reference characters represent like parts throughout the specification, FIG. 1 represents a specific embodiment of a linear flash lamp 9 made in accordance with the teaching of the present invention. As shown, a short thin cylindrical light-transparent envelope 10 has axially aligned electrodes 11 and 12 positioned at opposite ends. The envelope is filled with a mixture of argon and xenon gas in which the partial pressure of the argon at about 25° C. is 100 torr and the partial pressure of the xenon at about 25° C. is 600 torr. A trigger wire 13 may be placed around the lamp envelope between the end electrodes for the purpose of ionizing the argon to initiate the discharge or a means separate from the envelope may be used.

Figure 2:
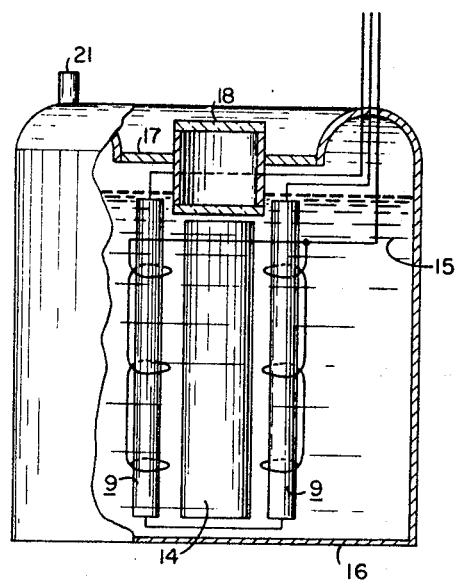
FIG. 2 represents a laser system operable at liquid nitrogen temperature with flash lamps of the present invention.

FIG. 2 is a diagrammatic representation of a laser system in which one or more flash lamps 9 made in accordance with the present invention provides excitation light for a laser element 14. The flash lamps 9 and laser element 14 are immersed in liquid nitrogen 15 or any other coolant contained in a Dewar 16 or any other suitable container. The upper end of the container is provided with a movable cover 17 which includes an optical window 18 in axial alignment with the container. The removable cover permits one to insert into the container of liquid nitrogen flash-lamp-laser assemblies having components of various types, sizes and shapes to carry out any desired operation. The window in the removable cover permits light from the laser to exit from the container. If it is desired to have the light emerge from each end of the laser element, a window may also be placed at the bottom of the container in alignment with the laser element. The container may be provided with one or more fill pipes 21 which may be used to replenish the liquid nitrogen and through which necessary electrical conductors may be passed and secured to the flash lamp and trigger wires. However, the electrical conductors may be permanently retained by mechanical supports or a seal at the aperture through which they pass.

In operation, an electrical potential of typically 3000 volts is maintained between the ends of the series of flash lamps 9 by a charged capacitance of typically 500 microfarads. A brief pulse of typically 20,000 volts applied to the trigger wire initiates ionization of the argon in the flash lamps, causing an electrical discharge to begin, supported by the charged capacitance. That discharge due to ionization of the argon heats and vaporizes frozen xenon in the lamps. As it vaporizes, the xenon becomes ionized by the existing discharge and allows the discharge current rapidly to reach the arc stage, which persists until the charge is removed from the capacitance. Light is generated by the arc discharge just as in prior art lamps at room temperature. However, the lamps 9 of this invention are immersed in the liquid nitrogen alongside the laser element 14 where the greatest proportion of the light output of the flash-lamp may be transferred to the laser element. It is clear that optical coupling means, such as cylindrical lenses between the flash lamps and the laser element, may be employed to improve the transfer of light to the laser element. However, the lamp is immersed within the liquid nitrogen within the Dewar.

Thus, is can be seen that the introduction of argon into prior-art xenon flash lamps provides suitable flash lamps for operation at low temperatures, e.g. in the liquid nitrogen range. The present invention has been described for use in a linear type flash lamp with argon starting gas. However, the invention may be carried out in helical, annular or otherwise shaped lamps as well and with other starting gases, such as helium, neon, krypton, hydrogen, and nitrogen; it is not to be limited to linear flash lamps with argon starting gas. Also the teaching extends to the operation of flash lamps at temperatures at which the arc sustaining operating gas freezes or at which the partial pressure of the operating gas, due to the coolant, is too low to initiate an arc.

Obviously many modifications and variations of the present invention are possible in the light of the above explanations. It is therefore to be understood that, within the scope of the appended claims, the invention may be practiced otherwise than as specifically described.

What is claimed is:
1. A flash lamp operable at an ambient temperature of $-180°$ C., and lower which comprises:
   a light transmissive envelope,
   spaced electrodes positioned within said envelope,
   xenon gas within said envelope,
   said xenon gas having a partial pressure of about 600 torr at about 25° C.,
   a second gas within said envelope mixed with said xenon gas,
   said second gas selected from a group consisting of helium, neon, argon, krypton, hydrogen and nitrogen and having a partial pressure sufficient to allow an arc discharge between said electrodes at an ambient temperature of about $-180°$ C. and lower.
2. A flash lamp as claimed in claim 1 wherein:
   said second gas is argon at a partial pressure of from 5 to 400 torr at about 25° C.
3. A flash lamp as claimed in claim 2 wherein:
   said argon gas has a partial pressure of about 100 torr at about 25° C.

References Cited

UNITED STATES PATENTS

| | | | |
|---|---|---|---|
| 2,654,043 | 9/1953 | Freeman et al. | 313—185 |
| 2,976,448 | 3/1961 | Berhidi et al. | 313—185 |
| 3,317,777 | 5/1967 | Algar et al. | 313—185 |
| 3,399,147 | 8/1968 | Turner | 313—226 X |

JAMES W. LAWRENCE, *Primary Examiner.*

R. F. HOSSFELD, *Assistant Examiner.*

U.S. Cl. X.R.

313—185, 223; 331—94.5